United States Patent [19]

Turcotte et al.

[11] Patent Number: 5,666,650
[45] Date of Patent: Sep. 9, 1997

[54] SPLIT NEIGHBOR LISTS FOR MULTIPLE HYPERBAND CAPABLE CELLULAR COMMUNICATIONS SYSTEMS

[75] Inventors: Eric Turcotte, Verdun; Richard Brunner, Montreal, both of Canada

[73] Assignee: Telefonaktiebolaget LM Ericsson, Stockholm, Sweden

[21] Appl. No.: 426,675

[22] Filed: Apr. 19, 1995

[51] Int. Cl.$^6$ .................................................. H04Q 7/00
[52] U.S. Cl. ................................. 370/329; 455/509
[58] Field of Search .................. 455/33.1, 34.1, 455/54.1, 56.1, 62, 63, 67.1, 67.3, 33.2; 379/39, 60

[56] References Cited

U.S. PATENT DOCUMENTS

| | | | |
|---|---|---|---|
| 4,916,728 | 4/1990 | Blair | 379/59 |
| 5,293,641 | 3/1994 | Kallin et al. | 455/33.1 |
| 5,499,386 | 3/1996 | Karlsson | 455/33.2 |
| 5,504,939 | 4/1996 | Mayrand et al. | 455/34.1 |
| 5,535,259 | 7/1996 | Dent | 379/59 |

OTHER PUBLICATIONS

IEEE Journal on Selected Areas in Communications, vol. 13, No.2, Feb. 1995; The GSM Procedures in an Integrated Cellular/Satellite System; P.Iannucci; pp. 421–430.

Fifth Nordic Seminar on Digital Mobile Radio Communications; *DMR V Proceedings*; Helsinki Finland; Ph.Duplessis, P.Simmons; pp. 1–3; Dec. 1992.

*Primary Examiner*—Reinhard J. Eisenzopf
*Assistant Examiner*—Darnell R. Armstrong
*Attorney, Agent, or Firm*—Jenkens & Gilchrist P. C.

[57] ABSTRACT

A split neighbor list for a multiple hyperband capable cellular communications system. The neighbor list includes a first data set targeted to Cellular hyperband only capable mobile stations identifying available Cellular hyperband channels. The split neighbor list further includes a second data set targeted to multiple hyperband capable mobile stations identifying available Cellular and PCS hyperband channels. In processing the first and second data sets of the split neighbor list, the multiple hyperband capable mobile stations replace the cellular channels identified in the first data set with cellular channels from the second data set prior to server selection or hand-off determination processing. Alternatively, channel information is extracted from the first data set to complete the second data set.

25 Claims, 2 Drawing Sheets

SPLIT NEIGHBOR LISTS FOR MULTIPLE HYPERBAND CAPABLE CELLULAR COMMUNICATIONS SYSTEMS

BACKGROUND OF THE INVENTION

1. Technical Field of the Invention

The present invention relates to cellular communications systems and, in particular, to such systems implementing multiple hyperband communications capabilities.

2. Description of Related Art

North American cellular communications have historically been implemented solely in the 800 MHZ Cellular hyperband. This Cellular hyperband is assigned two telephone frequency bands (commonly referred to as the A frequency band and the B frequency band) for carrying communications. The A and B frequency bands include the paging, control and other associated signaling channels necessary for setting up and maintaining cellular telephone calls, as well as the voice channels that are provided for carrying subscriber telephone communications.

Each frequency band within the Cellular hyperband is typically assigned to only one service company and is provided in the service area by that service company. For example, the A frequency band is usually reserved for use by non-wire line communications service companies, and the B frequency band is usually reserved for use by wire line communications service companies. In some instances, the particular communications frequency band (A or B) within the Cellular hyperband assigned to one service company for a given cell or service area may be assigned to a different service company in another cell or service area. Furthermore, in some cases the same service company will provide cellular communications service across both frequency bands. Alternatively, the individual channels within one frequency band may be assigned to different companies. The assignment of channels, frequency bands and hyperbands to service providers is dependent upon many factors including, for example, the size of the service area, the number of potential subscribers and the number of contracting providers.

The most recent evolution in cellular communications services involves the adoption of hyperbands other than the Cellular hyperband for handling mobile station communications. In accordance with the EIA/TIA Interim Standard IS-136 described in TIA project number PN3011 (the "IS-136 specification"), and specification PN3388-1 version Sep. 9, 1994, four different hyperbands have now been specified for use in handling mobile communications. These hyperbands comprise the Cellular hyperband previously in use and described briefly above, the Personal Communication Services (PCS) hyperband which has been established in the 1900 MHZ frequency range, and two other hyperbands that are currently reserved for future use but are not yet fully specified in terms of their operating characteristics.

Whereas the Cellular hyperband includes two frequency bands (A and B), the PCS hyperband in the United States of America is specified to include six different frequency bands (A, B, C, D, E and F). Thus, in accordance with the current IS-136 and PN3388 specifications, eight frequency bands (including multiple channels therein) are now available in any given service area to facilitate cellular communications services. With the existence of the new PCS hyperband, different types of subscriptions and/or services like speech quality, voice privacy, and encryption may exist from one hyperband to another, or from one frequency band in the Cellular hyperband to another frequency band in the PCS hyperband.

Reference is now made to FIG. 1 wherein there is shown a cell diagram illustrating an exemplary cell configuration for implementing multiple hyperband cellular communications services over an arbitrary geographic area (hereinafter "the service area") in accordance with the current IS-136 and PN3388 specifications utilizing both the Cellular and PCS hyperbands. The service area is divided into a plurality of cells 10 and 20. The cells 10 are represented by hexagrams and comprise communications cells wherein as many as two separate frequency bands (A and B) of radio frequency cellular communications are provided via multiple channels in the Cellular hyperband. The cells 20, are represented by circles and comprise communications cells wherein as many as six separate frequency bands (A through F) of radio frequency cellular communications are provided to mobile stations via multiple channels in the PCS hyperband.

In some instances, the Cellular hyperband cells 10 and the PCS hyperband cells 20 will be co-located, as generally shown at 12, and further may have comparable communications coverage areas, as generally shown at 14. Such cell characteristics, however, are not requirements for operation of a multiple hyperband communications system in accordance with the IS-136 and PN3388 specifications. Thus, different cell center locations and instances of overlapping cell coverage areas between the hyperbands will be a common occurrence, as generally shown at 16 and 18, respectively. Furthermore, it will often be the case that the combined communications coverage areas provided by all or part of two or more Cellular hyperband cells 10 will be contained within the coverage area of a single PCS hyperband cell 20, as generally shown at 22. Similarly, it is possible that the combined communications coverage areas provided by all or part of a PCS hyperband cell 20 will be contained within the coverage area of a single Cellular hyperband cell 10, as generally shown at 24.

Each of the Cellular hyperband cells 10 includes at least one base station 26 configured to facilitate communications over certain channels in at least one of the two available Cellular hyperband frequency bands. It is possible, and in fact may be preferred, for each of the cellular base stations 26 to possess the capability of communicating over both the A and B frequency bands of the Cellular hyperband. Similarly, each of the PCS hyperband cells 20 includes at least one PCS base station 28 configured to facilitate communications over certain channels in at least one of the six available PCS hyperband frequency bands. As with the cellular base stations 26, it is possible, and in fact may be preferred, for each of the PCS base stations 28 to possess the capability of communicating over more than one, and perhaps all six, of the frequency bands of the PCS hyperband. Although not shown in the figure for reasons of simplifying the illustration, in instances where a base station 26 or 28 does not provide coverage for all of the available hyperbands and/or the frequency bands therein, more than one base station will be needed in each cell. Furthermore, more than one base station may be needed per cell if there is a division of communications responsibility between service providers on a per channel basis.

The base stations 26 and 28 are illustrated as being positionally located at or near the center of each of the cells 10 and 20, respectively. However, depending on geography and other known factors, the base stations 26 and 28 may instead be located at or near the periphery of, or otherwise away from the centers of, each of the cells 10 and 20. In such instances, the base stations 26 and 28 may broadcast and communicate with mobile stations located within the cells 10 and 20 using directional rather than omni-directional antennas. Each one of the base stations 26 and 28 includes a transmitter, a receiver, and a base station controller connected to the antenna in a manner and with a configuration well known in the art.

Each one of frequency bands specified for the Cellular and PCS hyperbands is allocated a plurality of voice or speech channels and at least one access or control channel. The voice or speech channels carry subscriber telephonic communications. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, and cell selection or reselection instructions as a mobile station travels out of the radio coverage of one cell and into the radio coverage of another cell. The control or voice channels may operate either in an analog or digital mode or a combination thereof.

Many mobile stations having Cellular hyperband only communications capabilities were purchased prior to the adoption of the new multiple hyperband IS-136 and PN3388 specifications and are currently in use. These Cellular hyperband only capable mobile stations do not possess the functionality to access and communicate over, and thus fully take advantage of, the PCS hyperband. Accordingly, multiple hyperband capable mobile stations possessing communications capabilities in both the Cellular and PCS hyperbands have been developed and are now being placed into service in order for subscribers and providers to take full advantage of the hyperbands (and frequency bands therein) made available by the new IS-136 and PN3388 specifications.

Reference is now made to FIG. 2. In accordance with the new IS-136 specification, each mobile station functioning in idle operating mode receives from the cellular communications system a neighbor list 30 identifying the channels available to the mobile station for server selection. This neighbor list is transmitted to each mobile station over the control channel. In order to account for the availability in the service area of the PCS hyperband and the frequency bands therein, the server selection neighbor list 30 transmitted to each mobile station must include an identification of the channels available to the mobile station in both the Cellular (n1) and PCS (n2) hyperbands.

Unfortunately, the IS-136 specification allows for a maximum of twenty-four channels across both available hyperbands (n1+n2<=24) to be included in the server selection neighbor list 30 processed by each mobile station. The n2 portion of the server selection neighbor list 30 identifying available PCS hyperband channels is, however, of no use to Cellular hyperband only capable mobile stations which cannot communicate over the PCS hyperband channels. The inclusion of PCS hyperband channels in the server selection neighbor list 30 further serves to displace from the list certain (n2 in number) available Cellular hyperband channels that otherwise would have been provided for selection to the Cellular hyperband only mobile stations.

A similar problem under the IS-136 specification is presented when the mobile stations are functioning in an on call operating mode. In this case, the mobile station receives from the cellular communications system a MAHO neighbor list 32 identifying the channels the system wants the mobile station to scan for, measure on and report on periodically for purposes of making hand-off determinations. This MAHO neighbor list 32 is transmitted to each mobile station over the voice channel, and is determined from the hyperband capabilities of the mobile station and the channels identified in the neighbor list 30. A Cellular hyperband only capable mobile station will receive a MAHO neighbor list 32 which includes an identification of channels from the neighbor list 30 only in the Cellular hyperband. A multiple hyperband capable mobile station, on the other hand, will receive a MAHO neighbor list 32 identifying channels from the neighbor list 30 in both the Cellular and PCS hyperbands. It should be understood that the previous description specific to IS-136 is also applicable to its counterpart PN3388 specification.

Accordingly, there is a need for a cellular communications system having multiple hyperband communications capabilities that will make more efficient use of the limited number of entries allowed by the IS-136 and PN3388 specifications in both the server selection and MAHO neighbor lists. Such a system will provide relevant, useful and sufficient information not only to those mobile stations that are capable of operating across multiple hyperbands, but also to the large number of Cellular hyperband only capable mobile stations that are currently in use by cellular subscribers.

SUMMARY OF THE INVENTION

To address the foregoing problems associated with the transmission of server selection and MAHO neighbor lists to mobile stations operating in an IS-136, PN3388 specified multiple hyperband capable cellular communications system, the cellular communications system of the present invention transmits split server selection and MAHO neighbor lists to mobile stations.

The split neighbor list of the present invention includes a first data set identifying as many as twenty-four different Cellular hyperband candidate channels that may be selected for communications. The transmission further includes a second data set identifying as many as twenty-four different Cellular and PCS hyperband candidate channels that may be selected for communications. The first data set of the split neighbor list is targeted to Cellular hyperband only capable mobile stations, and the second data set is targeted to multiple hyperband capable mobile stations.

A cellular only capable hyperband mobile station will receive and process only the Cellular hyperband channels identified in the first data set, and ignore the Cellular and PCS hyperband channels identified in the second data set. Thus, in conformance with the IS-136 specification, the Cellular hyperband only capable mobile station will receive and process no more than the limit of twenty-four channels.

A multiple hyperband capable mobile station will, like the Cellular only hyperband mobile station, receive the Cellular hyperband channels identified in the first data set. However, the mobile station will substitute the Cellular hyperband channels identified in the second data set, if present, for those previously identified and received in the first data set to reduce the number of identified Cellular hyperband channels. Such a substitution further provides sufficient space for the receipt of PCS hyperband channels that are also identified in the second data set. Alternatively, Cellular hyperband channels identified in the first data set are selectively extracted to be included with the PCS hyperband channels identified in the second data set. Again, in conformance with the IS-136, PN3388 specification, the multiple hyperband capable mobile station will, after Cellular hyperband channel substitution or extraction, receive and process a total of no more than the limit of twenty-four Cellular and PCS hyperband channels.

BRIEF DESCRIPTION OF THE DRAWINGS

A more complete understanding of the split neighbor lists for the multiple hyperband cellular communications system of the present invention may be had by reference to the following Detailed Description when taken in conjunction with the accompanying Drawings wherein.

DETAILED DESCRIPTION OF EMBODIMENTS

Figure 1:
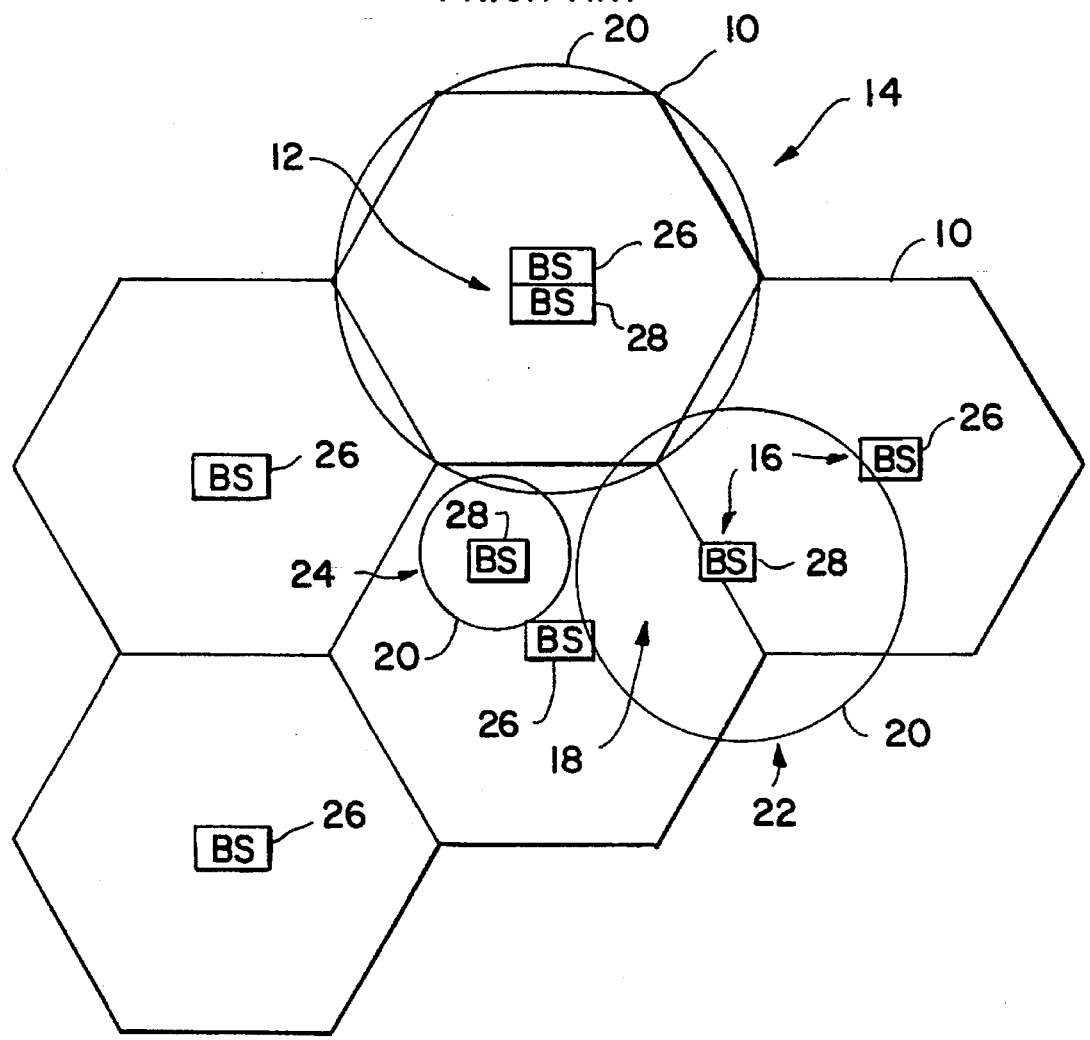
FIG. 1 is a cell diagram illustrating an exemplary cell configuration for implementing multiple hyperband cellular communications service in accordance with the current IS-136 and PN3388 specifications using both the Cellular and PCS hyperbands.
Figure 2:
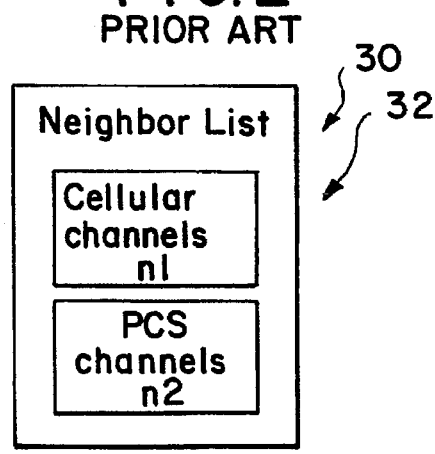
FIG. 2 is a block diagram illustrating the format of the server selection and MAHO neighbor lists in accordance with the IS-136 specification.
Figure 3:
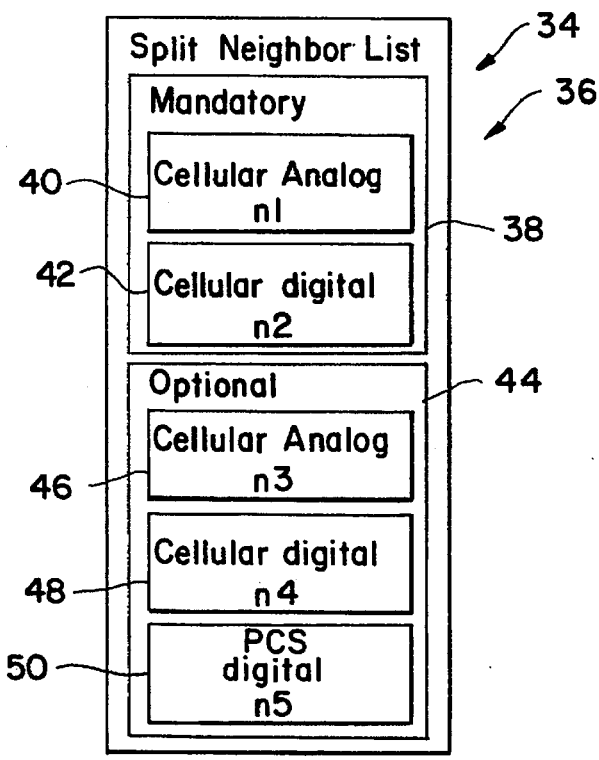
FIG. 3 is a block diagram illustrating the format of the split server selection and MAHO neighbor lists utilized in the multiple hyperband cellular communications system of the present invention.

Reference is now made to FIG. 3 wherein there is shown a block diagram of the split server selection and MAHO neighbor lists 34 and 36, respectively, of the present invention which are designed to replace the currently used IS-136 specification neighbor lists shown in FIG. 2.

Each of the neighbor lists 34 and 36 includes a first data set 38 identifying as many as twenty-four different Cellular hyperband channels available to either a Cellular hyperband only mobile station or a multiple hyperband mobile station. These specified channels in the first data set 38 are identified in a first data field 40 including a listing of n1 available Cellular hyperband analog control channels, and a second data field 42 including a listing of n2 available Cellular hyperband digital control channels (DCCH) (wherein n1+n2<=24).

The neighbor lists 34 and 36 further optionally include a second data set 44 identifying as many as twenty-four different Cellular and PCS hyperband channels available to a multiple hyperband capable mobile station. These specified channels in the second data set 44 are identified in a first data field 46 including a listing of n3 available Cellular hyperband analog control channels, a second data field 48 including a listing of n4 available Cellular hyperband digital control channels (DCCH), and a third data field 50 including a listing of n5 available PCS hyperband digital control channels (DCCH) (wherein: n3+n4+n5<=24).

The split server selection neighbor list 34 is transmitted over the control channel to multiple mobile stations functioning in the idle operating mode in a given cell. This list 34 identifies the channels available to the mobile station for server selection. The split MAHO neighbor list 36, on the other hand, is transmitted uniquely to individual mobile stations over the voice channel when the mobile station is functioning in the on call operating mode. This list 36 comprises, or is a subset of, the server selection neighbor list 34 that would be received by the mobile station if it were currently functioning in the idle operating mode. The MAHO list 36 accordingly identifies the channels that the communications system wants the mobile station to scan for, measure on, and report on periodically for purposes of facilitating system made hand-off determinations.

Figure 4:
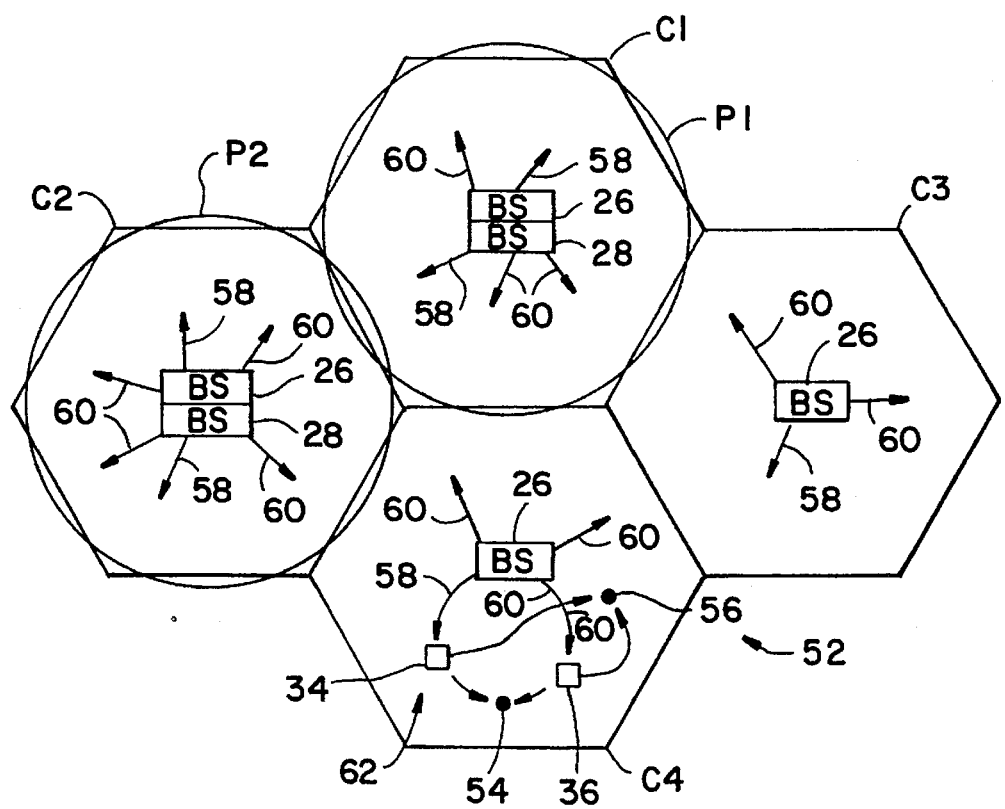
FIG. 4 is a cell diagram illustrating a multiple hyperband capable cellular communications system implementing the split neighbor list transmissions of the present invention.

Reference is now made to FIG. 4 wherein there is shown a cell diagram illustrating a multiple hyperband capable cellular communications system 52 implementing the server selection and MAHO split neighbor lists 34 and 36, respectively, of the present invention. The communications system comprises a number of Cellular hyperband cells C1–C4 and a number of PCS hyperband cells P1–P2. Within cell C4 of the system, there are currently located a Cellular hyperband only capable mobile station 54, and a multiple hyperband (Cellular and PCS) capable mobile station 56.

For each of the cells C1–C4 and P1–P2, the system 52 through base stations 26 and 28 transmits to each mobile station located therein a list of its cell "neighbors," and in particular the communications channels available therein, for the purpose of server selection. The server selection neighbor list 34 is transmitted to the mobile stations over the control channel 58 for the system 52. Conversely, while engaged in a subscriber communication, each mobile station will receive a transmission from the system a list of neighboring cells (and channels therein) for purposes of hand-off. This MAHO neighbor list 36 is transmitted to the mobile stations over the voice channel 60 currently in use by the mobile station for carrying subscriber voice communications (i.e., a telephone call). The MAHO neighbor list 36 comprises, or is a subset of, the server selection neighbor list 34 that would be received by the mobile stations 54 and 56 if they were functioning instead in the idle operating mode.

The mobile stations 54 and 56 are shown currently located in cell C4, and are assumed for the moment to be functioning in the idle operating mode. In accordance with the format of FIG. 3, and as generally indicated at 62, the split server selection neighbor list 34 transmitted by the system over the control channel 58 includes a mandatory first data set 38 identifying available Cellular hyperband channels (via fields 40 and 42) in neighboring Cellular hyperband cells C1, C2 and C3. The transmitted neighbor list 34 further includes an optional second data set 44 identifying the available Cellular and PCS hyperband channels (via fields 46, 48 and 50) in neighboring Cellular and PCS hyperband cells C1, C2, C3, P1 and P2. In order to comply with the limitations of the IS-136 specification, neither the first nor the second data set will individually include an identification of more than twenty-four channels, although it will be understood that the total number of channels identified in the neighbor list 34 across both data sets may exceed twenty-four in number.

The Cellular hyperband only capable mobile station 54 will receive the entire neighbor list 34 transmission, but will only use the information in the fields 40 and 42 in the first data set 38 concerning the available analog and digital Cellular hyperband channels in making its server selection determination. The Cellular and PCS hyperband information identified in the second data set will be ignored. Thus, the mobile station 54 will process no more than twenty-four potential neighbors in making its server selection determination, because no more than twenty-four channels will be included in the first data set 38 of the neighbor list 34.

The multiple hyperband capable mobile station 56, like the cellular only mobile station 54, will receive the entire neighbor list 34 transmission. The entire neighbor list 34 will not, however, be used by the mobile station 56 in making its server selection determination. The information in the first and second fields 40 and 42 of the first data set 38 concerning up to twenty-four available analog and digital Cellular hyperband channels will be used for server selection only if no other substitute information is provided by the system 52.

If the transmitted neighbor list 34 further includes a second data set 44, and if the second data set includes channel information in either or both the first and second fields 46 and 48, respectively, relating to available Cellular hyperband channels, this included information from the second data set will replace (through a substitution) the corresponding Cellular hyperband channel information previously received and included in the first data set 38. For example, the (n3) Cellular hyperband channel information in the second data set 44, first field 46, if included in the transmission, will replace the (n1) corresponding information previously received in the first data set 38, first field 40 of the transmission (thus, n2+n3+n5<=24). The mobile station 56 will further receive in the second data set 44, third field 50, of the neighbor list 34 transmission an identification of the (n5) available PCS hyperband channels. It is from the substituted Cellular hyperband channel information and the received PCS hyperband channel information that the multiple hyperband mobile station 56 will make its server selection determination. The substitution of the Cellular channels identified in the second data set 44 for those identified in the first data set 38 guarantees that the mobile station 56 will receive and process in accordance with the IS-136 specification no more than twenty-four potential neighbors in making its server selection determination (thus, n1+n2+n5<=24; n1+n4+n5<=24).

As an alternative to substitution as described above, either or both of the first and second fields 46 and 48 of the second data set 44 may include a "null" indication and thus specify no channels. In such a case, the multiple hyperband mobile station 56 will identify PCS hyperband channels from the third field 50 of the second data set 44, and will fill in the remainder of the available slots in the neighbor list (up to twenty-four entries) by selecting Cellular hyperband channels identified in fields 40 and 42 of the first data set 38. This "extraction" of cellular channels from the first data set 38 guarantees that the mobile station receives and processes sufficient channel information without violating the IS-136/PN3388 specifications.

Assuming now that the mobile stations 54 and 56 are instead functioning in the on call mode of operation, the system 52 will transmit a similar split neighbor list 36 with the format shown in FIG. 3 in the form of a MAHO list. As is well known to those skilled in the art, the MAHO neighbor list 36 identifies those channels that the system 52 wants the mobile station to scan for, make signal strength measurements on, and report on periodically to facilitate the making of a hand-off determination by the system. This MAHO list 36, unlike the server selection list 34, is unique to each mobile station and is transmitted by the system 52 over the voice channel 60 that is also carrying the telephonic voice communication of the subscriber.

The MAHO neighbor list 36 comprises, or is a subset of, the server selection neighbor list 34 that would have been received by the mobile stations over the control channel had the mobile stations been functioning in the idle operating mode. Again, as with the server selection neighbor list 34 of the present invention described above, the split MAHO neighbor list 36 will include a mandatory first data set 38 identifying Cellular hyperband neighbors and an optional second data set 44 identifying both Cellular and PCS hyperband neighbors. A Cellular hyperband only capable mobile station 54 will receive and process only those neighbors identified in the first data set 38 in making its hand-off determination. The information in the second data set 44 will be ignored. The multiple hyperband capable mobile station 56, on the other hand, will substitute the Cellular hyperband information (n3 and n4) in the second data set 44, if present, for the corresponding information (n1 and n2) previously sent in the first data set 38. Alternatively, in the event of a null transmission in one of the fields 46 or 48 of the second data set 44, channel information in the Cellular hyperband will be extracted from the first data set 38 and added to the PCS information. In no event, however, will the mobile stations 54 and 56 process more than twenty-four potential channels across the various hyperbands.

It is often the case that the provider of cellular service, as well as the subscriber himself, will desire to engage in cellular communications over only certain ones of the available channels in each of the provided hyperbands. For example, the provider of service may desire for the mobile station to engage in communications over only those channels to which the provider has been assigned control even though the mobile is capable of communicating over many other channels provided by others. Such restriction is desired because in many instances it is only from these owned channels that the provider can derive revenue from subscriber usage. Similarly, the subscriber himself may desire to only use certain ones of the many channels in the various hyperbands because access to channels provided by others may result in the assessing of a surcharge or other increased cost for the call.

With the split server selection and MAHO neighbor list of the present invention, not only does each type of mobile station receive up to twenty-four identified channels thus fully utilizing and satisfying the IS-136 specification, but also the system 52 has the capability of selectively transmitting to the mobile station only those channels that the service provider or subscriber desires. The provider may then in effect institute a preference through the transmission of the neighbor lists for the mobile station to utilize the provider's own channels. The neighbor list broadcast by the system will accordingly not include those channels of other providers, even though the mobile station is capable of scanning for, measuring on, and using these channels. The subscriber also benefits from this selective inclusion of channels in the neighbor list because the mobile station will operate to select only those channels for which no surcharge or other fee will be incurred during usage.

Although the split neighbor list of the present invention has been described with respect to server selection and hand-off for only the Cellular and PCS hyperbands, it will be understood that a split neighbor list in accordance with the present invention may be defined and utilized, in conformance with the IS-136 specification or otherwise, for any multiple hyperband cellular communications network or other communications system as are or become known to those skilled in the art. Thus, although a preferred embodiment of the present invention has been disclosed herein and illustrated in the accompanying Drawings, it is understood that the invention is not limited to the embodiment disclosed, but rather is capable of numerous rearrangements, modifications and substitutions without departing from the spirit of the invention as set forth and defined by the following claims.

What is claimed is:

1. A cellular communications system providing communications to mobile stations over a plurality of hyperbands, each hyperband including a plurality of available communications channels, the system comprising:

means for transmitting to mobile stations a neighbor list identifying available channels for communication, the neighbor list being split, to include:

a first data set identifying available first channels for mobile station communication in a first one of the plurality of hyperbands, the number of first channels not exceeding a predetermined maximum number of channels; and a second data set identifying available second channels for mobile station communication in the first one of the plurality of hyperbands and available third channels in a second one of the plurality of hyperbands, the sum of the number of second and third channels not exceeding the predetermined maximum number of channels.

2. The system of claim 1 wherein the available second channels identified in the second data set comprise substitute channels for replacing the first channels identified in the first data set.

3. The system as in claim 1 wherein certain ones of the available first channels are extracted from the first data set for replacing second channels missing from the first data set.

4. The system as in claim 1 wherein the neighbor list comprises a server selection neighbor list.

5. The system as in claim 1 wherein the neighbor list comprises a MAHO neighbor list.

6. The system as in claim 1 wherein the mobile stations comprise first hyperband only capable mobile stations and multiple hyperband capable mobile stations, the information in the first data set of the neighbor list being split, being targeted to first hyperband only mobile stations, and the information in the second data set of the neighbor list being split, being targeted to multiple hyperband capable mobile stations.

7. The system as in claim 6 wherein the available second channels identified in the second data set are substituted by multiple hyperband capable mobile stations for the first channels identified in the first data set in order to present for neighbor list consideration no more than the predetermined maximum number of channels.

8. The system as in claim 6 wherein certain ones of the first channels are extracted from the first data set by multiple hyperband capable mobile stations to replace second channels of the second data set if no second channels are identified.

9. A method for transmitting channel information to mobile stations operating in a cellular communications system including a plurality of hyperbands, each hyperband having a plurality of available communications channels, the method comprising the steps of:

transmitting a neighbor list to mobile stations identifying available channels for communication, the neighbor list being split, to include:

a first data set identifying available first channels for mobile station communication in a first one of the plurality of hyperbands, the number of first channels not exceeding a predetermined maximum number of channels; and a second data set identifying available second channels for mobile station communication in the first one of the plurality of hyperbands and available third channels in a second one of the plurality of hyperbands, the sum of the second and third channels not exceeding the predetermined maximum number of channels;

receiving, by first hyperband only capable ones of the mobile stations, said transmitted neighbor list being split;

receiving, by multiple hyperband capable ones of the mobile stations, said transmitted split neighbor list;

processing said received neighbor list being split, by the first hyperband only capable mobile stations to choose for communications among first channels identified in the first data set; and processing said received neighbor list being split, by the multiple hyperband capable mobile stations to choose for communications among the second and third channels identified in the second data set.

10. The method of claim 9 wherein the step of processing of the received neighbor list being split, by the multiple hyperband capable mobile stations further includes the step of substituting the second channels identified in the second data set for the first channels identified in the first data set.

11. The method as in claim 9 wherein the step of processing of the received neighbor list being split, by the multiple hyperband capable mobile stations further includes the steps of:

extracting certain ones of the first channels identified in the first data set; and substituting the extracted first channels for the second channels of the second data set if no second channel are identified.

12. A split neighbor list for use multiple hyperband capable cellular communications system, comprising:

a first data set identifying available channels for mobile station communications in a first one of a plurality of system supported communications hyperbands, said first data set targeted to mobile stations capable of operating only in the first hyperband; and a second data set identifying available channels for mobile station communications in both the first and a second one of a plurality of system supported communications hyperbands, said second data set targeted to mobile stations capable of operating in both the first and second hyperbands.

13. The split neighbor list of claim 12 wherein the total number of available channels in the first data set does not exceed a predetermined maximum.

14. The split neighbor list as in claim 13 wherein the total number of available channels in the second data set does not exceed the predetermined maximum.

15. The split neighbor list as in claim 12 wherein the channels of the first data set include analog and digital channels available in the first hyperband.

16. The split neighbor list as in claim 12 wherein the channels of the second data set include analog and digital channels available across the first and second hyperbands.

17. The split neighbor list as in claim 12 wherein the channels of the second data set for the first hyperband are substituted for the channels of the first data set of the first hyperband by mobile stations capable of operating in both the first and second hyperbands.

18. The split neighbor list as in claim 12 wherein certain ones of the channels of the first data set for the first hyperband are extracted to replace channels of the second data set for the first hyperbands by mobile stations capable of operating in both the first and second hyperbands if no channels of the first hyperband are identified.

19. A cellular communications system, comprising:

a plurality of first mobile stations capable of operation in only a first one of a plurality of available hyperbands, said first hyperband including a plurality of communications channels;

a plurality of second mobile stations capable of operation in both the first and a second one of the plurality of available hyperbands, said second hyperband including a plurality of communications channels; and means for transmitting a neighbor list to mobile stations identifying available channels across the hyperbands for mobile station communication, the neighbor list being split, to include:
- a first part identifying available channels for first mobile station communication in the first hyperband; and
- a second part identifying available channels for second mobile station communication in both the first and second hyperbands.

20. The system as in claim 19 wherein the neighbor list comprises a server selection neighbor list.

21. The system as in claim 19 wherein the neighbor list comprises a MAHO neighbor list.

22. The system as in claim 19 wherein the first mobile stations select a channel in the first hyperband from those identified in the first part of the neighbor list being split.

23. The system as in claim 19 wherein the second mobile stations select a channel in either the first or second hyperbands from those identified in the second part of the neighbor list being split.

24. The system as in claim 19 wherein the second mobile stations substitute channels of the first hyperband identified in the second part of the neighbor list being split, for those channels of the first hyperband identified in the first part of the neighbor list being split.

25. The system as in claim 19 wherein the second mobile stations extract channels of the first hyperband identified in the first part of the neighbor list being split, to replace channels of the first hyperband if no such channels are identified in the second part of the neighbor list being split.

* * * * *